US 10,618,395 B2

(12) United States Patent
Lee (10) Patent No.: US 10,618,395 B2
(45) Date of Patent: Apr. 14, 2020

(54) ATTACHMENT SYSTEM AND METHOD OF WEATHER STRIP (71) Applicants: HYUNDAI MOTOR COMPANY, Seoul (KR); KIA MOTORS CORPORATION, Seoul (KR)

(72) Inventor: Hyun Soo Lee, Seongnam-si (KR)

(73) Assignees: Hyundai Motor Company (KR); KIA Motors Corporation (KR)

(*) Notice: Subject to any disclaimer, the term of this patent is extended or adjusted under 35 U.S.C. 154(b) by 177 days.

(21) Appl. No.: 15/826,264

(22) Filed: Nov. 29, 2017

(65) Prior Publication Data

US 2019/0092152 A1 Mar. 28, 2019

(30) Foreign Application Priority Data

Sep. 22, 2017 (KR) .................. 10-2017-0122516

(51) Int. Cl.
| G06F 19/00 | (2018.01) |
| B60J 10/00 | (2016.01) |
| G05B 19/12 | (2006.01) |
| G05B 19/402 | (2006.01) |
| G05B 19/042 | (2006.01) |
| B23P 19/04 | (2006.01) |

(52) U.S. Cl.
CPC ............. *B60J 10/45* (2016.02); *B23P 19/047* (2013.01); *G05B 19/0426* (2013.01); *G05B 19/128* (2013.01); *G05B 19/402* (2013.01); *G05B 2219/45044* (2013.01); *G05B 2219/49015* (2013.01)

(58) Field of Classification Search
CPC ........... B60J 10/45; B60J 10/21; B23P 19/047
See application file for complete search history.

(56) References Cited

U.S. PATENT DOCUMENTS 6,269,705 B1 8/2001 Menguc
6,311,378 B1 11/2001 Menguc
(Continued)

FOREIGN PATENT DOCUMENTS

EP 2067645 B1 5/2011

OTHER PUBLICATIONS

English translated version of WO2017018249 to Kato et al., Feb. 2, 2017 (Year: 2017).*

*Primary Examiner* — Mohammad Ali
*Assistant Examiner* — Sheela Rao
(74) *Attorney, Agent, or Firm* — Brinks Gilson & Lione (57) ABSTRACT

The present disclosure provides an attachment system of a weather strip, including: a supply unit configured to unwind the weather strip that winds with a predetermined length and to supply the weather strip, an attaching unit configured to attach the weather strip to a surface of a component by the adhesive layer and to cut the weather strip at a predetermined position, a tag provided in the supply unit that is configured to store position information of the defective portion of the weather strip detected during the weather strip extruding process, a reader antenna provided during the weather strip assembling process that is configured to receive the position information of the defective portion, and a controller configured to control a cutting position of the weather strip discharging side of the attaching unit based on the position information of the defective portion.

12 Claims, 6 Drawing Sheets

(56) References Cited

U.S. PATENT DOCUMENTS

| | | |
|---|---|---|
| 6,450,049 B1 | 9/2002 | Menguc |
| 7,055,228 B2 | 6/2006 | Thommes et al. |
| 7,448,671 B2 * | 11/2008 | Rackers .............. B60R 13/0815 |
| | | 296/187.01 |
| 7,914,642 B2 | 3/2011 | Grohmann et al. |
| 8,398,808 B2 | 3/2013 | Grohmann et al. |
| 8,806,730 B2 | 8/2014 | Grohmann et al. |
| 8,900,499 B2 | 12/2014 | Berkemeier et al. |
| 9,096,113 B2 | 4/2015 | Kast et al. |
| 2007/0221323 A1 * | 9/2007 | Oba ...................... B23P 19/047 |
| | | 156/306.6 |
| 2012/0243933 A1 | 9/2012 | Raesch et al. |
| 2014/0020302 A1 | 1/2014 | Alba et al. |
| 2014/0352225 A1 | 12/2014 | Kast et al. |
| 2015/0034228 A1 | 2/2015 | Kast et al. |
| 2015/0151621 A1 | 6/2015 | Schwarzkopf et al. |
| 2015/0175092 A1 | 6/2015 | Thome et al. |
| 2018/0015748 A1 * | 1/2018 | Kato ....................... B41J 17/32 |

* cited by examiner

ATTACHMENT SYSTEM AND METHOD OF WEATHER STRIP

CROSS-REFERENCE TO RELATED APPLICATION

The present application claims priority to and the benefit of Korean Patent Application No. 10-2017-0122516, filed on Sep. 22, 2017, which is incorporated herein by reference in its entirety.

FIELD

The present disclosure relates to a weather strip attachment system and a method thereof, and more particularly, to a weather strip attachment system and a method thereof which automatically attach a weather strip to a moving part such as a door of a vehicle.

BACKGROUND

The statements in this section merely provide background information related to the present disclosure and may not constitute prior art.

Generally, a weather strip is employed between a vehicle body and a moving part, such as a door, a lid of a trunk, a tail gate, and a hood, as a sealing means. The weather strip is formed of a flexible rubber material. The weather strip blocks rain drops, dusts, outside air, or noise from inflowing into the vehicle and absorbs an impact of the moving part against the vehicle body. Further, the weather strip reduces the vibration while the vehicle is driving and also reduces a draft noise generated between the vehicle body and the moving part.

The weather strip is continuously supplied through a feed roll. And, a surface having an adhesive layer is continuously rolled along the circumference of the moving part and is attached to the weather strip.

A manufacturing process of a weather strip includes (i) a process of extruding a rubber material through a mold die of an extruding device to have a predetermined cross-sectional shape, and (ii) a process of attaching an adhesive layer, such as a double-sided adhesive tape, on a surface of the weather strip. Here, the adhesive layer is attached together with the extruding process. Also, the weather strip winds on the feed roll with a predetermined length and the feed roll is transported to an assembling process which attaches the weather strip to the moving part through the adhesive layer.

In the meantime, during the process of extruding the weather strip, the weather strip is inspected in a real time and a defective portion of the weather strip is detected as a result of the inspection.

During the process of attaching the weather strip to the moving part, a weather strip with no defective portion will be attached to the moving part.

Therefore, in this industrial field, many studies are ongoing to effectively recognize the defective portion of the weather strip during the process of attaching the weather strip to the moving part and to prevent the defective portion from being attached to the moving part.

The above information disclosed in this section is only for enhancement of understanding of the background of the disclosure and therefore it may contain information that does not form the prior art that is already known in this country to a person of ordinary skill in the art.

SUMMARY

The present disclosure provides a weather strip attachment system which automatically removes a defective portion and prevents the attachment of the defective portion of the weather strip to a component and an attachment method.

In some forms of the present disclosure, an attachment system of a weather strip, which attaches a weather strip with an adhesive layer attached thereto by a weather strip extruding process and an adhesive layer attaching process to a component by a weather strip assembling process, includes: i) a supply unit configured to unwind the weather strip that winds with a predetermined length and to supply the weather strip, ii) an attaching unit configured to attach the weather strip to a surface of the component by the adhesive layer and to cut the weather strip at a predetermined position, iii) a tag configured to store position information of defective portion of the weather strip that is detected during the weather strip extruding process, wherein the tag is provided in the supply unit, iv) a reader antenna configured to receive the position information of the defective portion of the weather strip, wherein the reader antenna is provided during the weather strip assembling process section, and v) a controller configured to control a cutting position of a weather strip discharging side of the attaching unit based on the position information of the defective portion of the weather strip.

In the attachment system of a weather strip in some forms of the present disclosure, the controller may be configured to calculate a first length of the weather strip that attaches to the component, calculate a second length of the weather strip that corresponds between a position of the defective portion of the weather strip and the weather strip discharging side of the attaching unit, and to control a cutting position of the weather strip discharging side of the attaching unit depending on the first length of the weather strip and the second length of the weather strip.

Further, in the attachment system of a weather strip in some forms of the present disclosure, the tag may be configured to store the position information of the defective portion of the weather strip that is detected through a vision inspection using a laser during the weather strip extruding process.

Further, in the attachment system of a weather strip in some forms of the present disclosure, the tag may be configured to store the position information of the defective portion of the weather strip that is present between an extrusion starting position of the weather strip and an extrusion ending position of the weather strip; and to transmit the position information of the defective portion of the weather strip to the controller through the reader antenna.

Further, in the attachment system of a weather strip in some forms of the present disclosure, when it is determined that the first length of the weather strip is longer than the second length of the weather strip, the controller may be configured to decide not to attach the weather strip to the component in the attaching unit, may discharge a section including the detective portion of the weather strip, and may apply a cutting signal of the weather strip to the attaching unit.

Further, in the attachment system of a weather strip in some forms of the present disclosure, the tag may include an active RFID to which power is supplied through a battery.

Further, in the attachment system of a weather strip in some forms of the present disclosure, the tag may include: a wireless transceiver unit configured to communicate wirelessly, a memory unit configured to store the position information of the defective portion of the weather strip, a control module unit configured to control the wireless transceiver unit and the memory unit, and a power source configured to supply power to the wireless transceiver unit, the memory unit, and the control module unit.

Further, the attachment system of a weather strip in some forms of the present disclosure may further include: a buffer unit which is disposed between the supply unit and the attaching unit, wherein the buffer unit is configured to absorb a difference between a supplied length of the weather strip and a demand length of the weather strip.

The attachment system of a weather strip in some forms of the present disclosure may further include: a robot configured to move and rotate the component such that the surface of the component corresponds to the weather strip discharging side of the attaching unit.

An attachment method of a weather strip in some forms of the present disclosure attaches a weather strip with an adhesive layer attached thereto during a weather strip extruding process and an adhesive layer attaching process to a component by a weather strip assembling process, and includes: (a) providing a tag configured to store position information of a defective portion of the weather strip and attaching the tag to a supply unit side of the weather strip, wherein the position information of the defective portion of the weather strip is detected during the weather strip extruding process, (b) unwinding the weather strip that winds on a supply unit with a predetermined length and supplying the weather strip, (c) attaching, with the adhesive layer, the weather strip to a surface of the component and cutting, with an attaching unit, the weather strip at a predetermined position, (d) receiving the position information of the defective portion of the weather strip that is stored in the tag when performing steps (b) and (c) with a reader antenna; and, (e) controlling a cutting position of a weather strip discharging side of the attaching unit based on the position information of the defective portion of the weather strip.

Further, in the attachment method of a weather strip in some forms of the present disclosure, step (e) may include, calculating a first length of the weather strip that attaches to the component, calculating a second length of the weather strip corresponding between a position of the defective portion of the weather strip and the weather strip discharging side of the attaching unit may be calculated, and controlling the cutting position of the weather strip in the weather strip discharging side of the attaching unit depending on the first length of the weather strip and the second length of the weather strip.

Further, in the attachment method of a weather strip in some forms of the present disclosure, step (e) may include, when it is determined that the first length of the weather strip is longer than the second length of the weather strip, deciding not to attach the weather strip to the component in the attaching unit, discharging section including the detective portion of the weather strip, and applying a cutting signal of the weather strip to the attaching unit.

In the attachment method of a weather strip in some forms of the present disclosure, the attachment method may include: storing, with the tag, the position information of the defective portion of the weather strip that is detected through a vision inspection using a laser during the weather strip extruding process.

In the attachment method of a weather strip in some forms of the present disclosure, the attachment method may include: storing, with the tag, the position information of the defective portion of the weather strip that is present between an extrusion starting position of the weather strip and an extrusion ending position of the weather strip.

Further, in the attachment method of a weather strip in some forms of the present disclosure, in step (c), a difference between a supplied length and a demand length of the weather strip may be absorbed by a buffer unit between the supply unit and the attaching unit.

Further, in the attachment method of a weather strip in some forms of the present disclosure, step (c) may include, moving and rotating the component such that the surface of the component corresponds to the weather strip discharging side of the attaching unit.

In some forms of the present disclosure, a position of the defective portion detected during the weather strip extruding process is effectively recognized in the weather strip assembling process. Accordingly, the section having a defective portion is automatically removed and prevented from being attached to the component.

Therefore, in some forms of the present disclosure, the defective portion of the weather strip is stably removed so that a weather strip which does not have a defective portion is attached to a moving part of a vehicle to improve a quality and reliability of the vehicle.

In addition, effects which may be obtained or predicted by some forms of the present disclosure will be directly or implicitly disclosed in the detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A size and a thickness of each component illustrated in the drawings are arbitrarily represented for the convenience of description so that the present disclosure is not necessarily limited to those illustrated in the drawings. Further, the thickness is enlarged to clearly represent various parts and areas.

In the following description, dividing names of components into first, second and the like is to divide the names because the names of the components are the same as each other and an order thereof is not particularly limited.

In the entire specification, unless explicitly described to the contrary, the word "comprise" and variations such as "comprises" or "comprising", will be understood to imply the inclusion of stated elements but not the exclusion of any other elements.

Further, the term described in the specification such as "unit", "means", "unit", or "member" means a unit of a comprehensive configuration which performs at least one function or operation.

Figure 1:
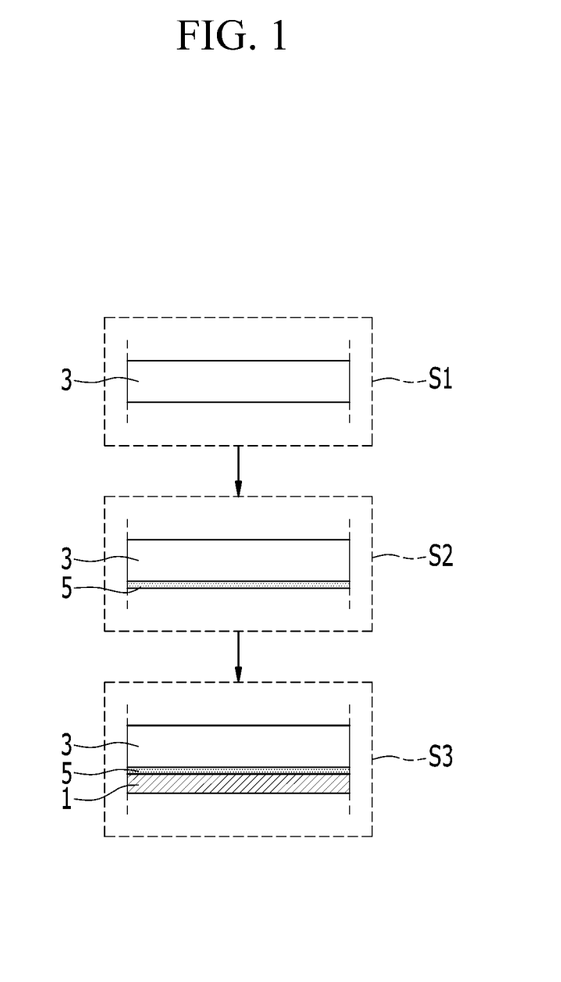
FIG. 1 is a view schematically showing a process for a weather strip attachment applied to a weather strip attachment system.

FIG. 1 is a view schematically showing a process for a weather strip attachment applied to a weather strip attachment in some forms of the present disclosures.

Referring to FIG. 1, an attachment system of a weather strip in some forms of the present disclosure may be applied to a weather strip assembling process S3 in which a rubber weather strip 3 interposed between a vehicle body and a predetermined component 1 of a vehicle is attached to a circumferential part of the component 1.

Here, the component 1 may include a moving part such as a door, a trunk lid, a tail gate, and a hood of a vehicle. However, in some forms of the present disclosure, an example in which the weather strip 3 is attached to a circumferential part of a door as the component 1 will be described.

The weather strip 3 blocks rain drops, dusts, outside air, or noise from inflowing into the vehicle and absorbs an impact of the moving part against the vehicle body. Further, the weather strip 3 prevents the vibration while the vehicle is driving and also prevents the generation of a draft noise through a clearance between the vehicle body and the moving part.

However, the scope of the present disclosure is not to be construed to be limited to attaching the weather strip to the moving part of the vehicle and the technical spirit of the present disclosure may be applied to anything that a seal member formed of a rubber material is attached to be adhered on various types of structures having various purposes.

In the meantime, the weather strip 3 is created through a weather strip extruding process S1 and an adhesive layer attaching process S2. For example, a double-sided adhesive tape is attached on one side thereof, as an adhesive layer 5. A protective tape may be attached on the adhesive layer 5.

In the above description, during the weather strip extruding process S1, a rubber material is extruded through a mold die of an extruding device to have a predetermined cross-sectional shape to manufacture the weather strip 3. During the adhesive layer attaching process S2, the adhesive layer 5 is attached to one surface of the extruded weather strip 3.

As described above, the weather strip 3 on which the adhesive layer 5 is attached through the weather strip extruding process S1 and the adhesive layer attaching process S2 is wound on a feed roll with a predetermined length and the feed roll is transported to a weather strip assembling process S3 which attaches the weather strip 3 to the component 1 through the adhesive layer 5.

On the other hand, the weather strip extruding process S1 includes a process of inspecting a defect of a surface and a cross-section of the weather strip 3 while extruding the weather strip 3 through a mold die.

Figure 2:
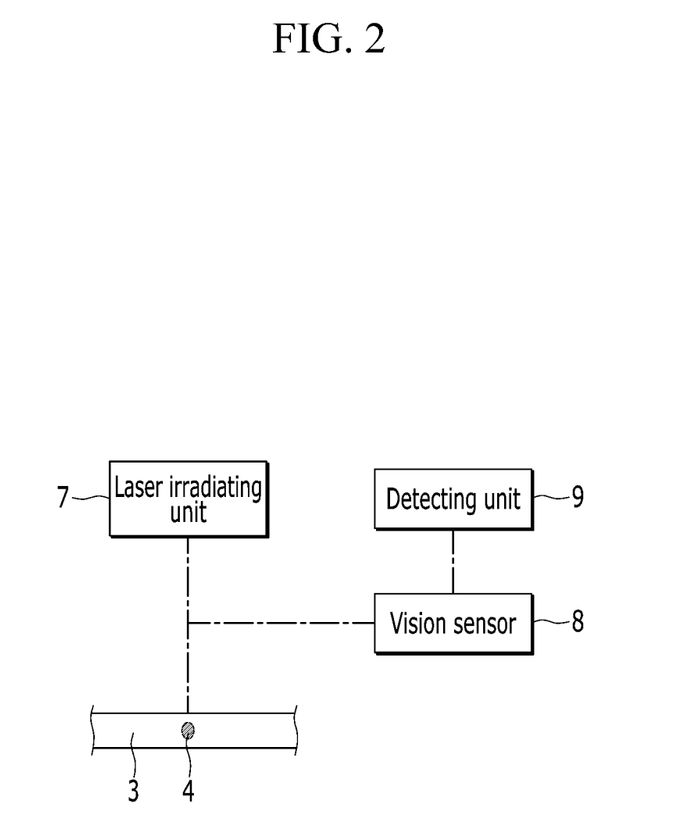
FIG. 2 is a schematic block diagram for a weather strip inspection applied to a weather strip attachment system.

For example, in the inspecting process, as illustrated in FIG. 2, a laser irradiating unit 7 which radiates laser onto a surface of the weather strip 3 and a vision sensor 8 which visibly photographs a portion radiated by the laser are included.

Further, in the inspecting process, a detecting unit 9 which obtains vision data from the vision sensor 8 and analyzes the vision data to detect a defective portion 4 in the weather strip 3 is included. As described above, the vision inspection using laser is widely known in the art so that a more detailed description will be omitted in this specification.

The attachment system 100 of a weather strip in some forms of the present disclosure is configured such that a position of the defective portion 4 detected in the weather strip extruding process S1 is effectively recognized in the weather strip assembling process S3, a section having the defective portion 4 is automatically removed, and the section having the defective portion 4 is not attached to the component 1.

Figure 3:
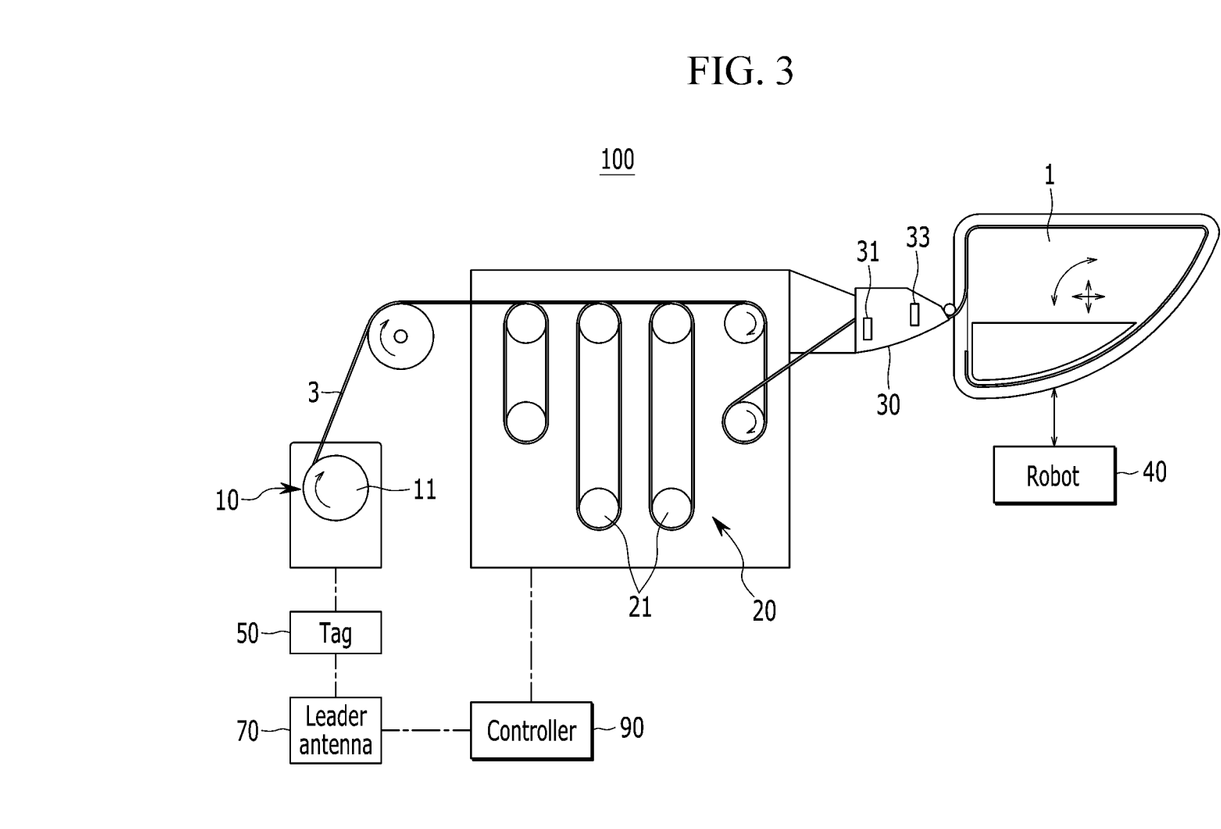
FIG. 3 is a front view schematically illustrating an attachment system of a weather strip.

FIG. 3 is a front view schematically illustrating an attachment system of a weather strip in some forms of the present disclosure.

Referring to FIG. 3, the attachment system 100 of a weather strip in some forms of the present disclosure basically includes a supply unit 10, an attaching unit 30, a tag 50, a reader antenna 70, and a controller 90. Hereinafter, the above-mentioned constituent elements will be described in detail with reference to FIG. 3 together with FIGS. 1 and 2.

All various constituent elements as described above may be installed in one frame (not illustrated) or individual divided frames in the weather strip assembling process S3.

The frames are provided to support the constituent elements and may include various sub-elements such as brackets, bars, rods, plates, blocks, rails, or collars.

However, the above-mentioned sub-elements are provided to install the constituent elements which will be described below in the frame so that various sub-elements are collectively referred to as frames in some forms of the present disclosure except for exceptional cases.

In some forms of the present disclosure, the supply unit 10 supplies the weather strip 3 to which the adhesive layer 5 is attached through the weather strip extruding process 51 and the adhesive layer attaching process S2 to a predetermined path.

The supply unit 10 includes a feed roll 11 which unwinds the weather strip 3 wound with a predetermined length to continuously supply the weather strip 3 to the attaching unit 30. The feed roll 11 is rotatably provided in a frame (not illustrated).

Here, a buffer unit 20 is disposed between the supply unit 10 and the attaching unit 30 to supply the weather strip 3 with a predetermined length from the supply unit 10 to the attaching unit 30. The buffer unit 20 includes a plurality of buffer rolls 21 which forms a predetermined path and is disposed between the supply unit 10 and the attaching unit 30 in a vertical direction.

The buffer unit 20 absorbs a length difference of the weather strip 3 supplied from the supply unit 10 to the attaching unit 30 along the predetermined path, through the buffer rolls 21. That is, the buffer unit 20 may absorb a difference between a supplied length and a demanded length of the weather strip 3.

In some forms of the present disclosure, the attaching unit 30 attaches the weather strip 3 supplied from the supply unit 10 through the buffer unit 20 to a circumferential surface of the component 1 by means of the adhesive layer 5 and cuts the weather strip 3 in a predetermined position.

The attaching unit 30 includes an attachment head 31 which attaches the weather strip 3 on the circumferential surface of the component 1 while ejecting the weather strip 3 and a cutter 33 which cuts the attached weather strip 3 along the circumference of the component 1.

Moreover, some forms of the present disclosure further include a robot 40 which moves and rotates the component 1 in the attaching unit 30 side. The robot 40 fixes the component 1 to an edge of an arm and moves and rotates the component 1 along a predetermined teaching path in a discharging side of the attachment head 31. Here, the robot 40 may move and rotate the component 1 such that a surface of the component 1 to which the adhesive layer 5 of the weather strip 3 is attached corresponds to the discharging side of the weather strip 3 of the attachment head 31.

The robot 40 moves and rotates the component 1 and continuously attaches the weather strip 3 which is ejected through the discharging side of the attachment head 31 on the surface of the circumference along the circumference of the component 1.

In some forms of the present disclosure, as mentioned above, the tag 50 receives position information of the defective portion 4 of the weather strip 3 which is detected through the detecting unit 9 during the weather strip extruding process S1 to store the position information of the defective portion 4.

The tag 50 is installed in the supply unit 10 side of the frame in the weather strip assembling process S3. For example, the tag 50 may be attached to the supply unit 10 side of the frame using a magnet.

The tag 50 is attached to the supply unit 10 side of the frame while receiving the position information of the defective portion 4 of the weather strip 3 from the detecting unit 9 through a reader (not illustrated) in the weather strip extruding process S1 to store the position information.

Here, the position information of the defective portion 4 refers to position data of the defective portion 4 which is detected through vision inspection of the weather strip 3 using a laser in the weather strip extruding process S1.

Moreover, the position information of the defective portion 4 may be defined as position data of at least one defective portion 4 which has a predetermined length and is present between an extrusion starting position and an extrusion ending position of the weather strip 3 wound on the supply unit 10.

In this case, the position data of the defective portion 4 includes a calculating value obtained by calculating a distance between a reference point and the defective portion 4 with respect to the extrusion starting position of the weather strip 3 between the extrusion starting position and the extrusion ending position of the weather strip 3.

Such a tag 50 is configured to receive position information of the defective portion 4 from the detecting unit 9 in the weather strip extruding process S1 as mentioned above and transmit the position information of the defective portion 4 to the controller 90 which will be further described below.

Figure 4:
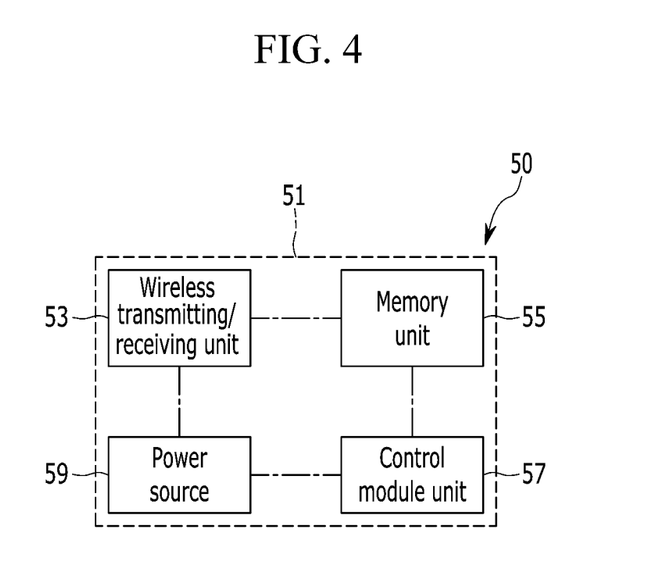
FIG. 4 is a block diagram schematically illustrating a tag which is applied to an attachment system of a weather strip.

For example, as illustrated in FIG. 4, the tag 50 may include an active RFID 51 to which power is supplied through a battery. The active RFID 51 basically includes a wireless transceiver unit 53, a memory unit 55, a control module unit 57, and a power source 59.

The wireless transceiver unit 53 performs wireless communication with the outside and performs the wireless communication between the detecting unit 9 in the weather strip extruding process 51 and the controller 90. That is, the wireless transceiver unit 53 wirelessly receives the position information of the defective portion 4 of the weather strip 3 from the detecting unit 9 through a tag ID and wirelessly transmits the position information of the defective portion 4 to the controller 90.

The memory unit 55 stores the position information of the defective portion 4 of the weather strip 3 which is received from the detecting unit 9 through the wireless transceiver unit 53 and is transmitted to the controller 90. The control module unit 57 controls operations of the wireless transceiver unit 53 and the memory unit 55.

Further, the power source 59 applies the power to the wireless transceiver unit 53, the memory unit 55, and the control module unit 57 and may include a battery which has been mentioned above.

Referring to FIGS. 1 to 3, the reader antenna 70 in some forms of the present disclosure is a relay unit which receives the position information of the defective portion 4 of the weather strip 3 stored in the memory unit 55 of the tag 50 and transmits the position information of the defective portion 4 to the controller 90. The reader antenna 70 is disposed in a section of the weather strip assembling process S3.

In the above description, the controller 90 is provided to control overall operations of constituent elements of the system 100. The controller 90 may be implemented by at least one microprocessor which operates by a predetermined program. The predetermined program may include a series of commands to carry out a method in some forms of the present disclosure which will be described below.

Figure 5:
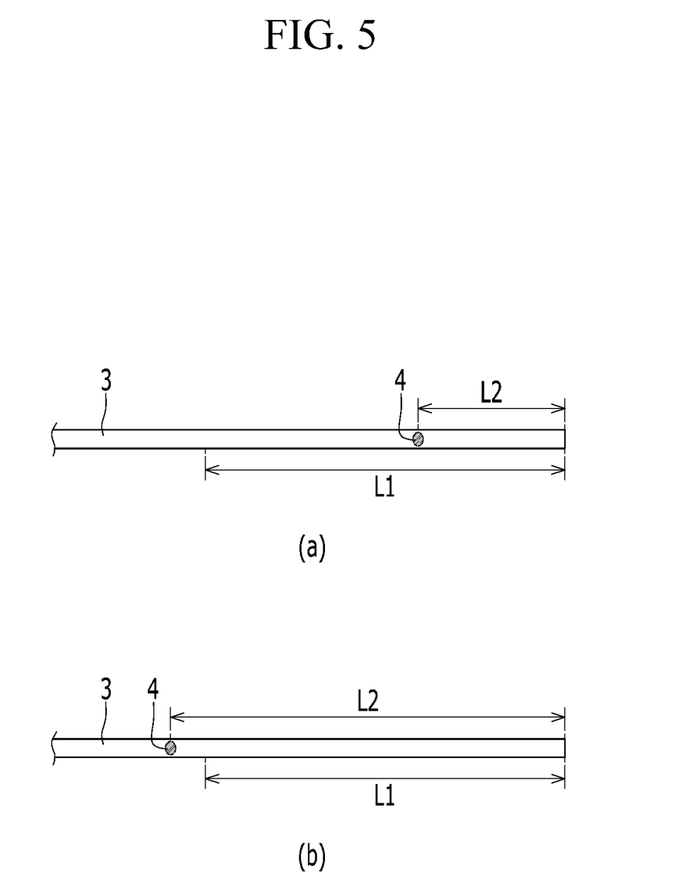
FIG. 5 is diagram illustrating a first length, a second length, and a defective portion of a weather strip applied to a weather strip attachment system in one form of the present disclosure.

As illustrated in FIGS. 3 and 5, the controller 90 may control a cutting position of the weather strip 3 in the discharging side of the attaching unit 30 based on the position information of the defective portion 4 of the weather strip 3 received through the leader antenna 70.

The controller 90 calculates a first length L1 of the weather strip 3 to be attached to a circumference of a single component 1 through the attaching unit 30. The controller 90 calculates a second length L2 of the weather strip 3 corresponding between the position of the defective portion 4 and the discharging side of the weather strip 3 of the attaching unit 30 based on the position information of the defective portion 4 of the weather strip 3 transmitted from the tag 50 through the reader antenna 70. Here, the first and second lengths L1 and L2 may be calculated by the controller 90 to be predetermined values or values varying in a real time.

An attachment method of a weather strip using an attachment system 100 of a weather strip in some forms of the present disclosure configured as described above will be described in detail with reference to previously disclosed drawings and accompanying drawings.

Figure 6:
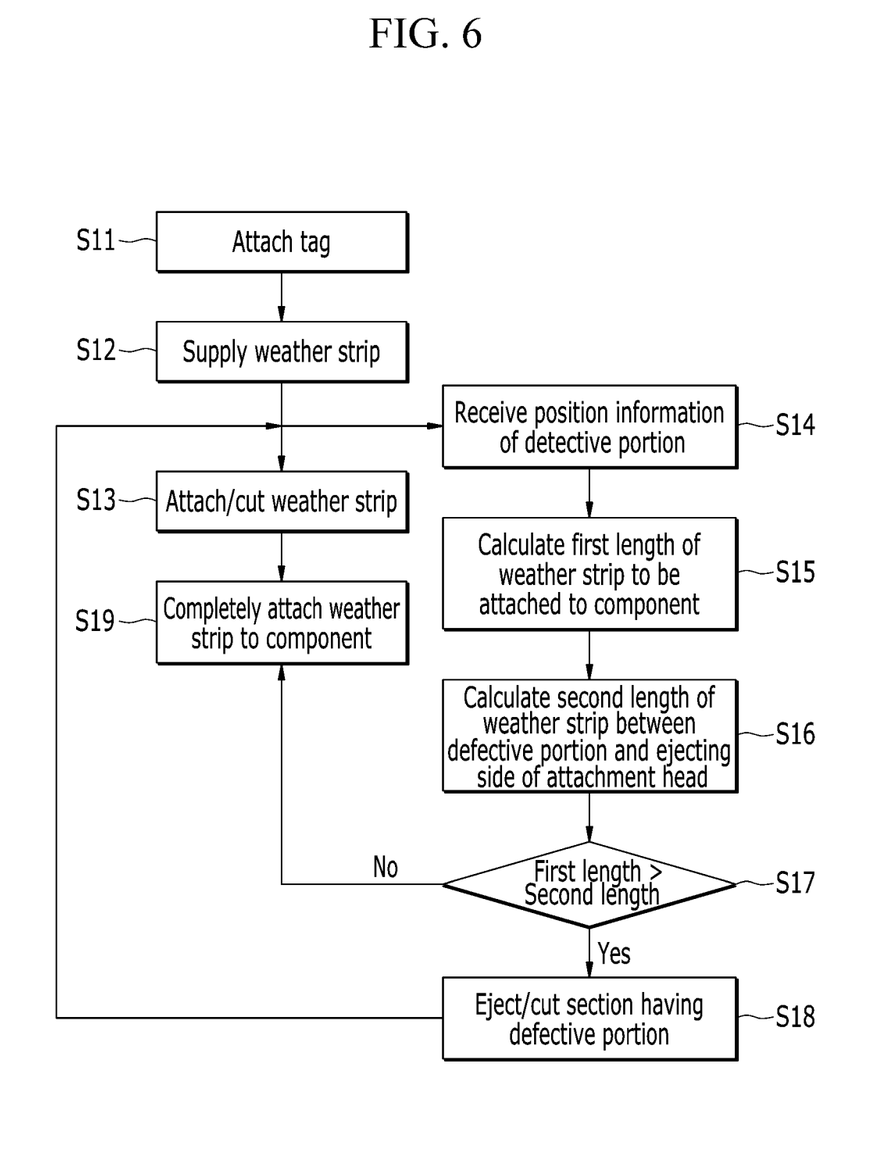
FIG. 6 is a flowchart for explaining an attachment method of a weather strip.

FIG. 6 is a flowchart for explaining an attachment method of a weather strip in some forms of the present disclosure.

First, prior to a process of attaching a weather strip 3 in a circumference of a component 1 in the weather strip assembling process S3, in the weather strip extruding process S1, a rubber material is extruded to have a predetermined cross-sectional shape through a mold die of an extruding device and a weather strip 3 is manufactured. Further, in an adhesive layer attaching process S2, an adhesive layer 5 is attached to one surface of the weather strip 3 extruded in the weather strip extruding process S1.

As described above, the weather strip 3 to which the adhesive layer 5 is attached through the weather strip extruding process S1 and the adhesive layer attaching process S2 is wound on a feed roll 11 with a predetermined length and the feed roll 11 is transported to a weather strip assembling process S3 in which the weather strip 3 is attached to the component 1 through the adhesive layer 5.

In the meantime, in the weather strip extruding process S1, a process of inspecting defects of a surface and a cross-section of the weather strip 3 is performed while extruding the weather strip 3.

In the inspecting process, laser is radiated onto the surface of the weather strip 3 by a laser irradiating unit 7 and a portion on which the laser is radiated is visibly photographed by a vision sensor 8. By doing this, the detecting unit 9 obtains vision data from the vision sensor 8 and analyzes the vision data to detect a defective portion 4 in the weather strip 3.

As described above, the position information of the defective portion 4 of the weather strip 3 detected by the detecting unit 9 in the weather strip extruding process S1 is transmitted to a tag 50 through a reader (not illustrated) and is stored in a memory unit 55 of the tag 50.

Here, the position information of the defective portion 4 includes a calculating value obtained by calculating a distance between a reference point and the defective portion 4 with respect to the extrusion starting position of the weather strip 3 between the extrusion starting position and the extrusion ending position of the weather strip 3.

In this state, in some forms of the present disclosure, as illustrated in FIG. 6, the tag 50 which stores the position information of the defective portion 4 of the weather strip 3 detected in the weather strip extruding process S1 is attached on a supply unit 10 side of a frame (not illustrated) in step S11.

Next, in some forms of the present disclosure, the weather strip 3 wound on the feed roll 11 of the supply unit 10 is unwound to be continuously supplied to the attaching unit 30 side along a predetermined path in step S12.

In this case, in some forms of the present disclosure, the weather strip 3 may be consistently supplied to the attaching unit 30 while absorbing a length difference of the weather strip 3 supplied from the supply unit 10 to the attaching unit 30 by a buffer unit 20.

In some forms of the present disclosure, the attaching unit 30 attaches the weather strip 3 on a surface at an edge of the circumference of the component 1 while ejecting the weather strip 3, which is supplied from the supply unit 10 through the buffer unit 20, through an attachment head 31, in step S13. Here, the attachment head 31 applies a pressure to the ejected weather strip 3 and may attach the weather strip 3 along the edge of the circumference of the component 1 by means of the adhesive layer 5.

During this process, in some forms of the present disclosure, the weather strip 3 discharged through the discharging side of the attachment head 31 may be continuously attached on the surface of the circumference along the circumference of the component 1 while moving and rotating the component 1 by a robot 40.

Further, in a state when the weather strip 3 with a predetermined length is attached on the edge of the circumference of the component 1, the attaching unit 30 cuts the weather strip 3 by means of a cutter 33 in step S13.

In the meantime, similarly to step S12, while supplying the weather strip 3 from the supply unit 10 to the attaching unit 30, in some forms of the present disclosure, the position information of the defective portion 4 of the weather strip 3 stored in the memory unit 55 of the tag 50 is received through a reader antenna 70 in step S14.

Simultaneously, in some forms of the present disclosure, a first length L1 of the weather strip 3 which will be attached to the circumference of the single component 1 through the attaching unit 30 is calculated in step S15. The first length L1 may vary in a real time and may be changed depending on a specification of the component 1.

Further, in some forms of the present disclosure, a second length L2 of the weather strip 3 corresponding between the position of the defective portion 4 and the discharging side of the weather strip 3 of the attaching unit 30 is calculated based on the position information of the defective portion 4 of the weather strip 3 transmitted from the tag 50 through the reader antenna 70 in step S16.

In the state when the first and second lengths L1 and L2 are calculated as described above, when it is determined that the first length L1 is longer than the second length L2 in step S17 (see FIG. 5A), in some forms of the present disclosure, the weather strip 3 is not attached to the component 1 through the attachment head 31 in the attaching unit 30.

During this process, a section including the defective portion 4 of the weather strip 3 is discharged to the outside through the attachment head 31 and a cutting signal of the weather strip 3 is applied to the cutter 33, and a predetermined position of the weather strip 3 is cut by the cutter 33 in step S18.

Next, in some forms of the present disclosure, similarly to step S13, a process of attaching the weather strip 3 to the component 1 and cutting the weather strip 3 is performed.

In the meantime, when it is determined that the first length L1 is shorter than the second length L2 in step S17 (see FIG. 5B), in some forms of the present disclosure, the attaching and cutting process of the weather strip 3 similarly to step S13 is performed and the attachment of the weather strip 3 to the component 1 is completed in step S19.

According to the attachment system 100 of the weather strip and an attachment method in some forms of the present disclosure which have been described, a position of the defective portion 4 detected during the weather strip extruding process S1 is effectively recognized in the weather strip assembling process S3 and the section having a defective portion 4 is automatically removed and the section having a defective portion 4 of the weather strip 3 may be prevented from being attached to the component 1.

Therefore, in some forms of the present disclosure, the defective portion 4 of the weather strip 3 is stably removed so that a weather strip 3 which does not have a defective portion is attached to a moving part of a vehicle to improve a quality and reliability of the vehicle.

The description of the disclosure is merely exemplary in nature and, thus, variations that do not depart from the substance of the disclosure are intended to be within the scope of the disclosure. Such variations are not to be regarded as a departure from the spirit and scope of the disclosure.

| <Description of symbols> | |
|---|---|
| 1: Component | 3: Weather strip |
| 4: Defective portion | 5: Adhesive layer |
| 7: Laser irradiating unit | 8: Vision sensor |
| 9: Detecting unit | 10: Supply unit |
| 11: Feed roll | 20: Buffer unit |
| 21: Buffer roll | 30: Attaching unit |
| 31: Attachment head | 33: Cutter |
| 40: Robot | 50: Tag |
| 51: RFID | 53: Wireless transceiver unit |
| 55: Memory unit | 57: Control module unit |
| 59: Power source | 70: Reader antenna |
| 90: Controller | L1: First length |
| L2: Second length | S1: Weather strip extruding process |
| S2: Adhesive layer attaching process | |
| S3: Weather strip assembling process | |

What is claimed is:

1. An attachment system for attaching a weather strip to a component during a weather strip assembling process, where an adhesive layer is attached to the weather strip during a weather strip extruding process and an adhesive layer attaching process, the attachment system comprising:
   a supply unit configured to unwind the weather strip that winds with a predetermined length and to supply the weather strip;
   an attaching unit configured to attach the weather strip to a surface of the component by the adhesive layer and to cut the weather strip at a predetermined position;
   a tag provided in the supply unit and configured to:
      store position information of defective portion of the weather strip, wherein a detector is configured to detect the defective portion of the weather strip during the weather strip extruding process;
      receive, from the detector, the position information of the defective portion of the weather strip through a reader antenna, wherein the reader antenna is provided during the weather strip assembling process; and
   a controller configured to control a cutting position of a weather strip discharging side of the attaching unit based on the position information of the defective portion of the weather strip,
   wherein the tag is further configured to:
      store the position information of the defective portion of the weather strip that is detected through a vision inspection using a laser during the weather strip extruding process;
      store the position information of the defective portion of the weather strip that is present between an extrusion starting position of the weather strip and an extrusion ending position of the weather strip; and
      transmit the position information of the defective portion of the weather strip to the controller through the reader antenna.

2. The attachment system of claim 1, wherein the controller is configured to:
   calculate a first length of the weather strip that attaches to the component;
   calculate a second length of the weather strip that corresponds between a position of the defective portion of the weather strip and the weather strip discharging side of the attaching unit; and
   control a cutting position of the weather strip in the weather strip discharging side of the attaching unit depending on the first length of the weather strip and the second length of the weather strip.

3. The attachment system of claim 2, wherein when it is determined that the first length of the weather strip is longer than the second length of the weather strip, the controller is configured to:
   decide not to attach the weather strip to the component in the attaching unit;
   discharge a section including the detective portion of the weather strip; and
   apply a cutting signal of the weather strip to the attaching unit.

4. The attachment system of claim 1, wherein the tag comprises an active radio frequency identification (RFID) to which power is supplied through a battery.

5. The attachment system of claim 1, wherein the tag comprises:
   a wireless transceiver unit configured to communicate wirelessly;
   a memory unit configured to store the position information of the defective portion of the weather strip;
   a control module unit configured to control the wireless transceiver unit and the memory unit; and
   a power source configured to supply power to the wireless transceiver unit, the memory unit, and the control module unit.

6. The attachment system of claim 1, wherein the attachment system further comprises:
   a buffer unit configured to absorb a difference between a supplied length of the weather strip and a demand length of the weather strip, wherein the buffer unit is provided between the supply unit and the attaching unit.

7. The attachment system of claim 1, wherein the attachment system further comprises:
   a robot configured to move and rotate the component such that the surface of the component corresponds to the weather strip discharging side of the attaching unit.

8. An attachment method for attaching a weather strip to a component during a weather strip assembling process, where an adhesive layer is attached to the weather strip during a weather strip extruding process and an adhesive layer attaching process, the attachment method comprising the steps of:
   (a) providing a tag configured to store position information of a defective portion of the weather strip and attaching the tag to a supply unit side of the weather strip, wherein the position information of the defective portion of the weather strip is detected during the weather strip extruding process;
   (b) unwinding the weather strip that winds on a supply unit with a predetermined length and supplying the weather strip;
   (c) attaching, with the adhesive layer, the weather strip to a surface of the component and cutting, with an attaching unit, the weather strip at a predetermined position;
   (d) receiving the position information of the defective portion of the weather strip that is stored in the tag when performing steps (b) and (c) with a reader antenna; and
   (e) controlling a cutting position of a weather strip discharging side of the attaching unit based on the position information of the defective portion of the weather strip;
   wherein the attachment method further comprises:
      storing, with the tag, the position information of the defective portion of the weather strip that is detected through a vision inspection using a laser during the weather strip extruding process; and
      storing, with the tag, the position information of the defective portion of the weather strip that is present between an extrusion starting position of the weather strip and an extrusion ending position of the weather strip.

9. The attachment method of claim 8, wherein step (e) comprises:
   calculating a first length of the weather strip that attaches to the component;
   calculating a second length of the weather strip corresponding between a position of the defective portion of the weather strip and the weather strip discharging side of the attaching unit; and
   controlling the cutting position of the weather strip in the weather strip discharging side of the attaching unit depending on the first length of the weather strip and the second length of the weather strip.

10. The attachment method of a weather strip of claim 9, wherein step (e) comprises:

when it is determined that the first length of the weather strip is longer than the second length of the weather strip, deciding not to attach the weather strip to the component in the attaching unit;

discharging a section including the detective portion of the weather strip; and applying a cutting signal of the weather strip to the attaching unit.

11. The attachment method of claim 8, wherein step (c) comprises:

absorbing, with a buffer unit, a difference between a supplied length of the weather strip and a demand length of the weather strip, wherein the buffer unit is provided between the supply unit and the attaching unit.

12. The attachment method of a weather strip of claim 11, wherein step (c) comprises:

moving and rotating the component such that the surface of the component corresponds to the weather strip discharging side of the attaching unit.

\* \* \* \* \*